US009337716B2

(12) United States Patent
Liao et al.

(10) Patent No.: US 9,337,716 B2
(45) Date of Patent: May 10, 2016

(54) POWER SUPPLY CIRCUIT WITH PFC FUNCTION, AND AUTOMATIC GAIN CONTROL CIRCUIT THEREFOR AND CONTROL METHOD THEREOF

(71) Applicants: Chia-Wei Liao, Zhubei (TW); Jing-Meng Liu, Zhubei (TW)

(72) Inventors: Chia-Wei Liao, Zhubei (TW); Jing-Meng Liu, Zhubei (TW)

(73) Assignee: RICHTEK TECHNOLOGY CORPORATION, R.O.C., Chupei, Hsinchu (TW)

( * ) Notice: Subject to any disclaimer, the term of this patent is extended or adjusted under 35 U.S.C. 154(b) by 608 days.

(21) Appl. No.: 13/846,568

(22) Filed: Mar. 18, 2013

(65) Prior Publication Data
US 2013/0250631 A1  Sep. 26, 2013

Related U.S. Application Data

(60) Provisional application No. 61/615,263, filed on Mar. 24, 2012.

(51) Int. Cl.
*H02M 1/42* (2007.01)
*H02M 1/12* (2006.01)

(52) U.S. Cl.
CPC ............ *H02M 1/126* (2013.01); *H02M 1/4208* (2013.01); *Y02B 70/126* (2013.01)

(58) Field of Classification Search
CPC ..... H02M 1/126; H02M 1/42; H02M 1/4208; H02M 1/4216; H02M 1/4225; H02M 1/4233; H02M 1/4241; H02M 1/425; H02M 1/4258; H02M 1/4266; H02M 2001/4275; H02M 2001/4283; H02M 2001/4291; Y02B 70/12; Y02B 70/126

USPC ......... 315/247, 291–311; 323/205–211, 271, 323/281–285, 299, 351
See application file for complete search history.

(56) References Cited

U.S. PATENT DOCUMENTS

| 7,205,749 B2* | 4/2007 | Hagen ................. G05F 1/70 323/207 |
| 8,390,357 B2* | 3/2013 | Hung .................. H02M 1/4208 323/282 |
| 2011/0148324 A1* | 6/2011 | Du ..................... H05B 33/0812 315/297 |
| 2011/0316518 A1 | 12/2011 | Feng et al. |

(Continued)

FOREIGN PATENT DOCUMENTS

| CN | 1661381 A | 8/2005 |
| CN | 1841924 A | 10/2006 |

(Continued)

*Primary Examiner* — Timothy J Dole
*Assistant Examiner* — Ivan Laboy Andino
(74) *Attorney, Agent, or Firm* — Tung & Associates

(57) ABSTRACT

The present invention discloses a power supply circuit with power factor correction (PFC) function, and an automatic gain control circuit therefor and a control method thereof. The power supply circuit includes the automatic gain control circuit and a load driver circuit. The automatic gain control circuit converts an input voltage to a regulation voltage, and the load driver circuit generates an output current according to the regulation voltage. The automatic gain control circuit automatically adjust the regulation voltage such that the regulation voltage has a substantially fixed amplitude or fixed average value under different input voltages of different specifications, and the output current provided by the load driver circuit varies in phase with the input voltage to provide a PFC function.

25 Claims, 6 Drawing Sheets

(56) References Cited

U.S. PATENT DOCUMENTS

| | | | |
|---|---|---|---|
| 2012/0043908 A1* | 2/2012 | Hung | H05B 33/0809 315/291 |
| 2012/0126759 A1* | 5/2012 | Lee | H02M 1/4225 323/205 |
| 2013/0038229 A1* | 2/2013 | Kojima | H05B 33/0851 315/200 R |
| 2015/0289329 A1* | 10/2015 | Schultz | H05B 33/0845 315/200 R |

FOREIGN PATENT DOCUMENTS

| | | |
|---|---|---|
| CN | 101042591 A | 9/2007 |
| WO | WO 2005/001938 A1 | 1/2005 |

\* cited by examiner

POWER SUPPLY CIRCUIT WITH PFC FUNCTION, AND AUTOMATIC GAIN CONTROL CIRCUIT THEREFOR AND CONTROL METHOD THEREOF

CROSS REFERENCE

The present invention claims priority to U.S. provisional application No. 61/615,263, filed on Mar. 24, 2012.

FIELD OF INVENTION

The present invention relates to a power supply circuit with power factor correction (PFC) function, and an automatic gain control circuit therefor and a control method thereof; particularly, it relates to such power supply circuit, and automatic gain control circuit therefor and control method with automatic gain control and PFC function.

DESCRIPTION OF RELATED ART

FIG. 1 shows a schematic diagram of a prior art power supply circuit 100. As shown in FIG. 1, a voltage Vac is for example an AC voltage signal, which is to be rectified; however, the voltage Vac can be a DC voltage signal. A rectifier circuit 101 rectifies the voltage Vac to generate an input voltage Vin1. The rectifier circuit 101 for example is a bridge rectifier circuit. The power supply circuit 100 includes a PFC circuit 102, a power stage circuit 103, and a control circuit 105. The PFC circuit 102 converts the input voltage Vin1 to an input voltage Vin2 and outputs a current Iin2, wherein the current Iin2 is in phase with the input voltage Vin2 (i.e., the timings when the amplitude of the current Iin2 reaches its peak and valley are the same as the timings when the amplitude of the input voltage Vin2 reaches its peak and valley), to improve the power factor of the power conversion. The PFC circuit 102 is typically a power converter circuit which includes one or more power switches and an inductor, which is well known by those skilled in the art, so the details thereof are omitted here. The control circuit 105 generates a driving signal GATE for operating a power switch in the power stage circuit 103 to convert the input voltage Vin2 to an output voltage Vout and to provide an output current Iout to a load (not shown). The prior art power supply circuit 100 has a drawback of a relatively high manufacturing cost because it requires the PFC circuit 102, and the PFC circuit 102 includes expensive components such as the power switch and the inductor. If the PFC circuit 102 is omitted, the manufacturing cost can be reduced significantly.

Besides the PFC function, because the specification of the voltage Vac is different (such as 110V or 220V) in different countries, it is preferable for the power supply circuit to be capable of generating the same output current Iout (i.e., with the same amplitude or average value) even if the voltages Vac (or the rectified input voltages Vin1) is different.

In view of above, to overcome the drawbacks in the prior art shown in FIG. 1, the present invention proposes a power supply circuit, and an automatic gain control circuit therefor and a control method thereof, which can generate an output current with the same amplitude or the same average value under different input voltages, the output current and the input voltage Vin are in phase.

SUMMARY OF THE INVENTION

From one perspective, the present invention provides a power supply circuit, for generating an output current according to an input voltage, wherein the output current has a substantially same average value under different input voltages of different specifications, the power supply circuit including: an automatic gain control (AGC) circuit, for generating a regulation signal which is in phase with the input voltage, wherein the regulation signal has a substantially same amplitude or average value under different input voltages of different specifications; and a load driver circuit, controlled by the regulation signal with an open loop connection, for generating the output current.

In one preferable embodiment, the load driver circuit includes a control circuit and a power stage circuit, wherein the control circuit receives the regulation signal with an open loop connection and generates a driving signal for controlling the power stage circuit to generate the output current according to the regulation signal.

In one preferable embodiment, the automatic gain control circuit includes: a voltage-to-current converter circuit for converting an input voltage to a regulation current; a current-to-voltage converter circuit, which is coupled to the voltage-to-current converter circuit, for converting the regulation current to a regulation voltage; a low-pass filter circuit, which is coupled to the current-to-voltage converter circuit, for obtaining a low frequency signal from the regulation voltage; and a comparison circuit, which is coupled to the low-pass filter circuit, for generating a control signal according to the low frequency signal and a reference voltage to control a parameter in the voltage-to-current converter circuit, such that the regulation voltage maintains at a substantially same amplitude or average value under different input voltages of different specifications. And the regulation signal is the regulation voltage or a signal derived from the regulation voltage.

In another preferable embodiment, the automatic gain control circuit includes: a voltage-to-current converter circuit for converting an input voltage to a regulation current; a current-to-voltage converter circuit, which is coupled to the voltage-to-current converter circuit, for converting the regulation current to a regulation voltage; a low-pass filter circuit, which is coupled to the current-to-voltage converter circuit, for obtaining a low frequency signal from the regulation voltage; and a comparison circuit, which is coupled to the low-pass filter circuit, for generating a control signal according to the low frequency signal and a reference voltage to control a parameter in the current-to-voltage converter circuit, such that the regulation voltage maintains at a substantially same amplitude or average value under different input voltages of different specifications. And the regulation signal is the regulation voltage or a signal derived from the regulation voltage.

In another preferable embodiment, the comparison circuit is a differential amplifier circuit.

From another perspective, the present invention provides a power supply circuit, including: an automatic gain control circuit, including: a voltage-to-current converter circuit for converting an input voltage to a regulation current; a current-to-voltage converter circuit, which is coupled to the voltage-to-current converter circuit, for converting the regulation current to a regulation voltage; a low-pass filter circuit, which is coupled to the current-to-voltage converter circuit, for obtaining a low frequency signal from the regulation voltage; and a comparison circuit, which is coupled to the low-pass filter circuit, for generating a control signal according to the low frequency signal and a reference voltage; and a load driver circuit, which is coupled to the current-to-voltage converter circuit, for converting the input voltage to the output voltage and supplying an output current, wherein the output current is in phase with the regulation voltage; wherein the control signal is inputted to the voltage-to-current converter circuit or the current-to-the voltage converter circuit, for adjusting a conversion ratio from the input voltage to the regulation current, or from the regulation current to the regulation voltage.

From another perspective, the present invention provides an automatic gain control circuit of a power supply circuit, wherein the power supply circuit is for converting an input voltage to an output voltage and supplying an output current, wherein the output current is in phase with the input voltage, the automatic gain control circuit including: a voltage-to-current converter circuit, for converting the input voltage to a regulation current; a current-to-voltage converter circuit, which is coupled to the voltage-to-current converter circuit, for converting the regulation current to the regulation voltage; a low-pass filter circuit, which is coupled to the current-to-voltage converter circuit, for obtaining a low frequency signal from the regulation voltage; and a comparison circuit, which is coupled to the low-pass filter circuit, for generating a control signal according to the low frequency signal and a reference voltage; wherein the control signal is inputted to the voltage-to-current converter circuit or the current-to-the voltage converter circuit, for adjusting a conversion ratio from the input voltage to the regulation current, or from the regulation current to the regulation voltage.

In one preferable embodiment, the voltage-to-current converter circuit includes: a differential amplifier circuit, for generating a differential amplified signal according to the input voltage and a regulation current feedback signal; a transistor, which is coupled to the differential amplifier circuit, for operating to generate the regulation current according to the differential amplified signal; and a variable resistor circuit, which is coupled to the transistor, for generating the regulation current feedback signal according to the regulation current, wherein a resistance of the variable resistor circuit is controlled by the control signal.

In the aforementioned embodiment, the variable resistor circuit may include a metal oxide semiconductor (MOS) device, which has a resistance controlled by the control signal.

In the aforementioned embodiment, the current-to-voltage circuit may include: a current mirror circuit, for generating a duplicated regulation current by duplicating the regulation current; and an impedance circuit, which is coupled to the current mirror circuit, for converting the duplicated regulation current to the regulation voltage.

In another preferable embodiment, the current-to-voltage converter circuit includes: a current mirror circuit, for generating a duplicated regulation current by duplicating the regulation current; and a variable resistor circuit, which is coupled to the current mirror circuit, for converting the duplicated regulation current to the regulation voltage, wherein the variable resistor circuit has a resistance controlled by the control signal.

In the aforementioned embodiment, the variable resistor circuit may include a metal oxide semiconductor (MOS) device, which has a resistance controlled by the control signal.

In another preferable embodiment, the voltage-to-current converter circuit further includes an upper limit gain determination circuit, which is connected to the variable resistor circuit in series, for determining an upper limit of a gain of the automatic gain control circuit.

In another preferable embodiment, the voltage-to-current converter circuit further includes a lower limit gain determination circuit, which is connected to the variable resistor circuit in parallel, for determining a lower limit of a gain of the automatic gain control circuit.

In another preferable embodiment, the current mirror circuit further includes a constant current source, for determining a minimum level of the regulation voltage.

In another preferable embodiment, the load driver circuit includes: a differential amplifier circuit, for generating a differential amplified signal according to the regulation voltage and a current sense signal; a power stage circuit, for operating at least one power switch therein according to the differential amplified signal, to convert the input voltage to the output voltage and to supply an output current; and a current sense circuit, which is coupled to the differential amplifier circuit, for generating the current sense signal according to the output current or a signal which is related to the output current.

From another perspective, the present invention provides a control method of an automatic gain control circuit for use in a power supply circuit, wherein the power supply circuit is for converting an input voltage to an output voltage, and supplying an output current, wherein the output current is in phase with the input voltage, the control method including: converting the input voltage to a regulation current; converting the regulation current to a regulation voltage; filtering the regulation voltage to obtain a low frequency signal; and generating a control signal according to the low frequency signal; wherein the control signal is for adjusting a conversion ratio from the input voltage to the regulation current, or from the regulation current to the regulation voltage.

In one preferable embodiment, the control method further includes: determining an upper limit conversion ratio and/or a lower limit conversion ratio from the input voltage to the regulation current to determine an upper limit of a gain and/or a lower limit of a gain of the automatic gain control circuit.

In another preferable embodiment, the control method further includes: determining an upper limit conversion ratio or a lower limit conversion ratio from the regulation current to the regulation voltage to determine an upper limit of a gain or a lower limit of a gain of the automatic gain control circuit.

In another preferable embodiment, the control method further includes: determining a minimum level of the regulation voltage.

The objectives, technical details, features, and effects of the present invention will be better understood with regard to the detailed description of the embodiments below.

DESCRIPTION OF THE PREFERRED EMBODIMENTS

Figure 1:
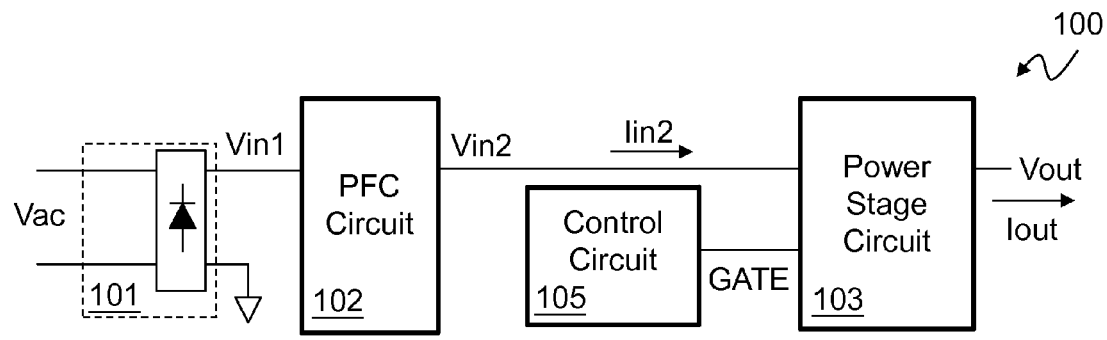
FIG. 1 shows a schematic diagram of a prior art power supply circuit 100.
Figure 2A:
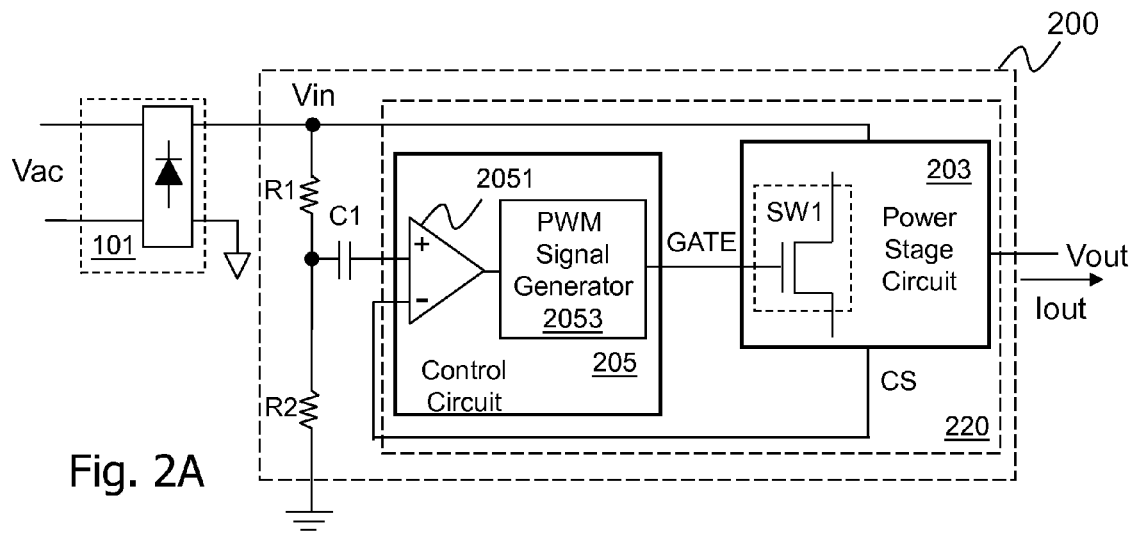
FIG. 2A shows a first embodiment of the present invention.

FIG. 2A shows a first embodiment of the present invention. As shown in FIG. 2A, it is not required for the power supply circuit 200 to include a PFC circuit; the PFC circuit is omitted in a power supply circuit 200. The power supply circuit 200 includes a power stage circuit 203 and a control circuit 205, wherein the control circuit 205 generates a driving signal GATE, for operating at least one power switch SW1 in the power stage circuit 203 to convert an input voltage Vin to an output voltage Vout. The power stage circuit 203 is for example but not limited to a synchronous or asynchronous buck, boost, inverting, buck-boost, inverting-boost, and flyback power stage circuit as shown in FIGS. 9A-9K. The control circuit 205 includes a differential amplifier circuit 2051 and a pulse width modulation (PWM) signal generator 2053, wherein the differential amplifier circuit 2051 has one input terminal which receives a current sense signal CS related to an output current Iout, and has another input terminal which receives a signal related to the input voltage Vin. The differential amplifier circuit 2051 compares the current sense signal CS and the signal related to the input voltage Vin, and amplifies their difference to generate an amplified signal which is sent to the PWM signal generator 2053, whereby the PWM signal generator 2053 generates the driving signal GATE. In this embodiment, the input voltage Vin is divided by resistors R1 and R2 connected in series, and a capacitor C1 is provided to stabilize the divided voltage inputted to the input terminal of the differential amplifier circuit 2051. This arrangement is preferable but not absolutely necessary. For example, the input voltage Vin may be inputted to the differential amplifier circuit 2051 directly without being divided by the resistors R1 and R2, or without being stabilized by the capacitor C1, if the differential amplifier circuit 2051 can sustain a high voltage or the fluctuation is not a concern. By feedback control mechanism, the levels of the two input terminals of the differential amplifier circuit 2051 will be equal to each other (assuming that an internal bias of the differential amplifier circuit 2051 can be ignored) when the circuit is at a balanced state. Therefore, the current sense signal CS will follow the input voltage Vin, i.e., the phase of the output current Iout will follow the phase of the input voltage Vin, and thus the PFC function is achieved in this embodiment.

In the power supply circuit 200 of the first embodiment, the amplitude or the average value of the output current Iout will change if the specification of the voltage Vac is different, such as a different amplitude of 110V or 220V. To further improve this, the present invention provides the following embodiments wherein not only the phase of the output current Iout is the same as the phase of the input voltage Vin, but also an amplitude or average of the output current Iout is kept the same even if the voltage Vac has a different specification, by providing an automatic gain control circuit in the power supply circuit.

Figure 2B:
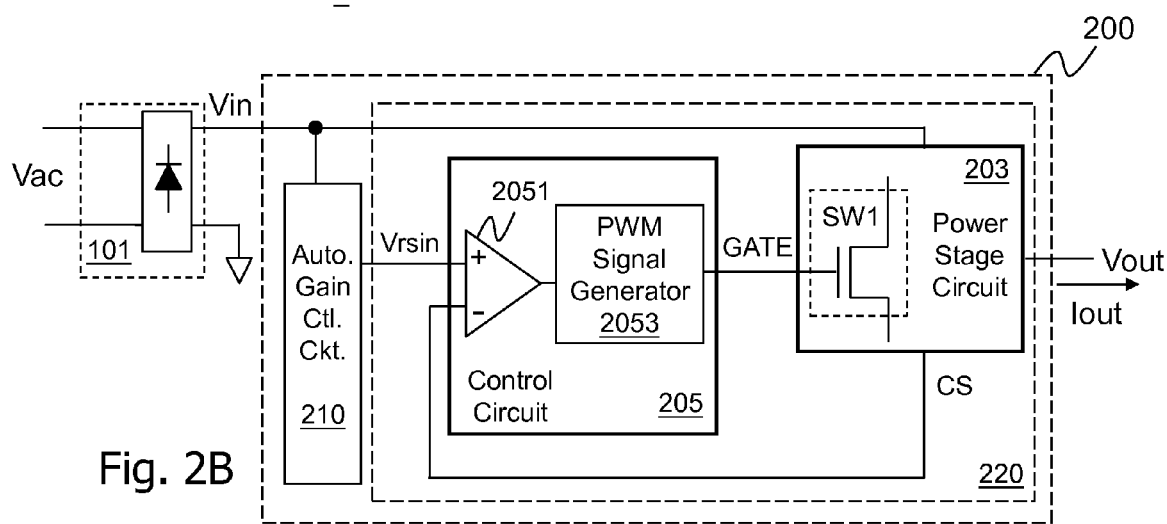
FIG. 2B shows a second embodiment of the present invention.

FIG. 2B shows a second embodiment of the present invention. As shown in FIG. 2B, a power supply circuit 200 includes an automatic gain control circuit 210 and a load driver circuit 220, wherein the load driver circuit 220 includes for example but not limited to the power stage circuit 203 and the control circuit 205 as shown in the first embodiment. The automatic gain control circuit 210 converts the input voltage Vin to a regulation voltage Vrsin. In the process of converting the input voltage Vin to the regulation voltage Vrsin, the regulation voltage Vrsin is in phase with the input voltage Vin, but a conversion ratio between the input voltage Vin and the regulation voltage Vrsin is automatically adjusted, such that the regulation voltage Vrsin has a substantially fixed amplitude or average value even if the specification of the input voltage Vin is different. The term "substantially fixed" is used because there may be factors affecting the amplitude or average of the regulation voltage Vrsin such as noises, etc., and the term "substantially fixed" intends to mean that the amplitude or average of the regulation voltage Vrsin does not significantly change beyond a tolerable error.

Note that, in the process of converting the input voltage Vin to the regulation voltage Vrsin by the automatic gain control circuit 210, the automatic gain control circuit 210 does not obtain any feedback signal from the load driver circuit 220; that is, the automatic gain control circuit 210 and the load driver circuit 220 are electrically connected to form an open loop connection. This arrangement has an advantage that: a designer can design the load driver circuit 220 simply based on the requirements for driving the load, such that the settings of the parameters of the load driver circuit 220 are much simpler as compared with the case wherein the load driver circuit 220 is required to provide a feedback signal to the automatic gain control circuit 210. For example, if the load is a light emitting diode (LED) circuit, the load driver circuit 220 may be an LED driver circuit which is designed to drive the LED circuit, and it is only required to connect an input terminal of the differential amplifier circuit 2051 to the regulation voltage Vrsin, without changing any other parameter setting of the LED driver circuit.

Figure 3:
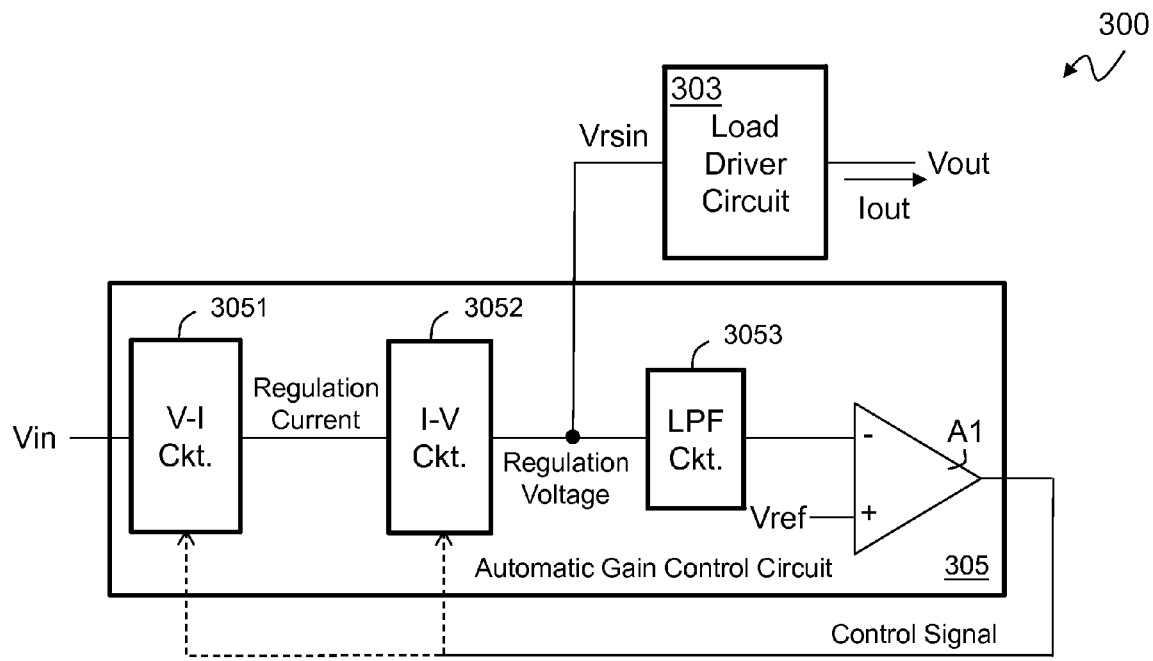
FIG. 3 shows a third embodiment of the present invention.

FIG. 3 shows a third embodiment of the present invention. This embodiment shows a more specific embodiment of the automatic gain control circuit. As shown in FIG. 3, a power supply circuit 300 includes an automatic gain control circuit 305 and a load driver circuit 303. The automatic gain control circuit 305 for example can be applied to the second embodiment as the automatic gain control circuit 210, and the load driver circuit 303 for example has the structure of the load driver circuit 220 of the second embodiment. The automatic gain control circuit 305 includes a voltage-to-current converter circuit (V-I Ckt.) 3051, a current-to-voltage converter circuit (I-V Ckt.) 3052, a low-pass filter circuit (LPF Ckt.) 3053, and a differential amplifier circuit A1. The current-to-voltage converter circuit 3051 converts the input voltage Vin to a regulation current. The current-to-voltage converter circuit 3052 is coupled to the voltage-to-current converter circuit 3051, for converting the regulation current to the regulation voltage Vrsin. In the process of converting the input voltage Vin to the regulation current, then to the regulation voltage Vrsin, the regulation voltage Vrsin and the input voltage Vin are in phase, and a conversion ratio from the input voltage Vin to the regulation current, or a conversion ratio from the regulation current to the regulation voltage Vrsin, is automatically adjusted, such that the regulation voltage Vrsin has a substantially fixed amplitude. The load driver circuit 303 for example may include the power stage circuit 203 and the control circuit 205 as shown in FIG. 2B, to convert the regulation voltage Vrsin to the output voltage Vout and to supply the output current Iout, so that the output current Iout has the same phase as the regulation voltage Vrsin, i.e., the same phase as the input voltage Vin. The low-pass filter circuit 3053 is coupled to the current-to-voltage converter circuit 3052, for obtaining a low frequency signal from the regulation voltage Vrsin, which can be regarded as obtaining an average of the regulation voltage Vrsin. The differential amplifier circuit A1 is coupled to the low-pass filter circuit 3053, for generating a control signal according to the low frequency signal and a reference voltage Vref. The control signal may be fed back to the voltage-to-current converter circuit 3051 or the current-to-voltage converter circuit 3052 to automatically adjust the conversion ratio from the input voltage Vin to the regulation current, or the conversion ratio from the regulation current to the regulation voltage Vrsin. By feedback control mechanism, the levels of the two input terminals of the differential amplifier circuit A1 will be equal to each other (assuming that an internal bias of the differential amplifier circuit A1 can be ignored) when the circuit is at a balanced state. Therefore, the feedback control loop controls the average of the regulation voltage Vrsin to be substantially equal to the reference voltage Vref; that is, the regulation voltage Vrsin has a substantially fixed average value regardless of the different amplitude of the input voltage Vin. Thus, if there is no other factor changing the amplitude of the regulation voltage Vrsin, the amplitude of the regulation voltage Vrsin will have a substantially fixed amplitude; if there is any factor changing the amplitude of the regulation voltage Vrsin (such as changing its peak or valley level), the average value of the regulation voltage Vrsin still maintains unchanged even though its amplitude is changed.

Figure 4:
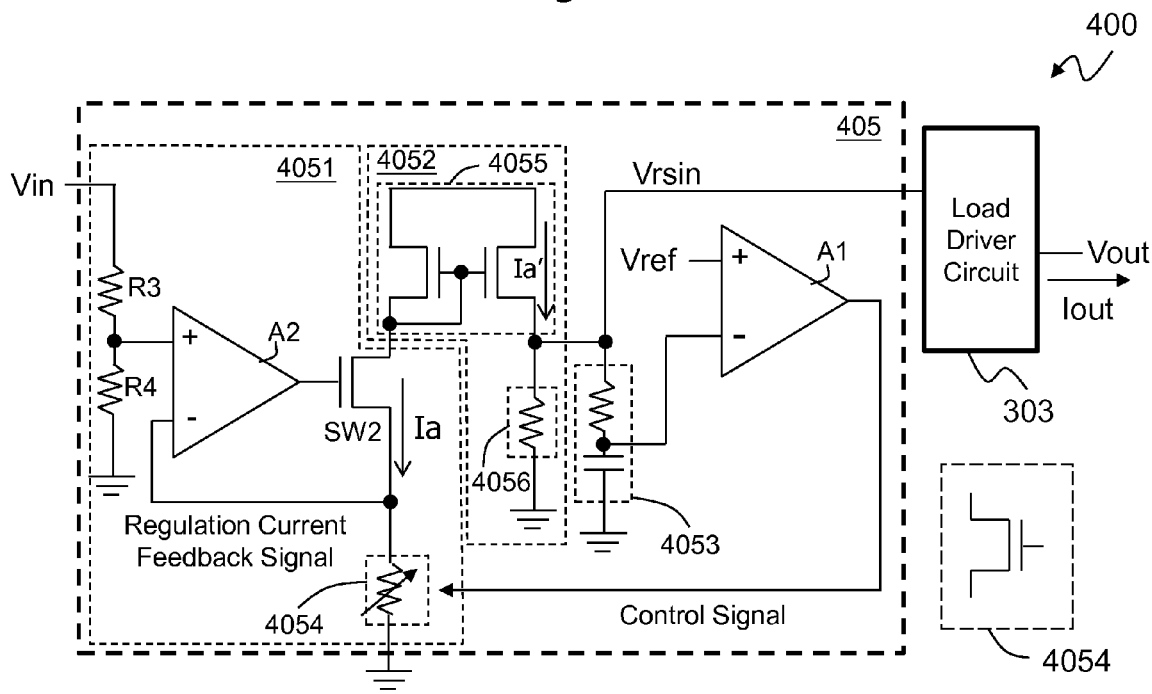
FIG. 4 shows a fourth embodiment of the present invention.

FIG. 4 shows a fourth embodiment of the present invention. As shown in FIG. 4, a power supply circuit 400 includes an automatic gain control circuit 405 and the load driver circuit 303. The automatic gain control circuit 405 includes a voltage-to-current converter circuit 4051, a current-to-voltage converter circuit 4052, a low-pass filter circuit 4053, and a differential amplifier circuit A1. The voltage-to-current converter circuit 4051 includes a differential amplifier circuit A2, a transistor SW2, and a variable resistor circuit 4054. The differential amplifier circuit A2 is for generating a differential amplified signal according to the input voltage Vin and a regulation current feedback signal. The transistor SW2 is coupled to the differential amplifier circuit A2, which operates to generate a regulation current Ia according to the differential amplified signal. The variable resistor circuit 4054 is coupled to the transistor SW2, for generating the regulation current feedback signal according to the regulation current Ia. As shown in the figure, the differential amplifier circuit A2 receives a divided voltage signal of the input voltage Vin (a voltage drop across a resistor R4), and compares it with the regulation current feedback signal, to generate the differential amplified signal which operates the transistor SW2. Therefore, the regulation current Ia is equal to the divided voltage (the voltage drop across the resistor R4) of the input voltage Vin divided by a resistance of the variable resistor circuit 4054. The variable resistor circuit 4054 includes for example but not limited to a metal oxide semiconductor (MOS) device as shown in the lower right of the figure, which has a resistance controllable by the control signal. In other words, when the control signal changes the resistance of the resistor circuit 4054, the regulation current Ia is correspondingly changed, so that the conversion ratio from the input voltage Vin to the regulation current is automatically adjusted. Under the same spirit of the present invention, the conversion ratio from the input voltage Vin to the regulation current can be adjusted in various other ways. For example, in the circuit shown in FIG. 4, one or both of the resistors R3 and R4 can be replaced by a variable resistor(s), and the control signal can adjust the resistance of the variable resistor(s) to adjust the conversion ratio.

Referring to FIG. 4, in this embodiment, the current-to-voltage converter circuit 4052 includes: a current mirror circuit 4055 and an impedance circuit 4056. The current mirror circuit 4055 is coupled to the transistor SW2, for generating a duplicated regulation current Ia' by duplicating the regulation current Ia. The impedance circuit 4056 is for example but not limited to a resistor as shown in the figure, which is coupled to the current mirror circuit 4055, for converting the duplicated regulation current Ia' to the regulation voltage Vrsin. The low-pass filter circuit 4053 may be an RC series circuit as shown in the figure.

Figure 5:
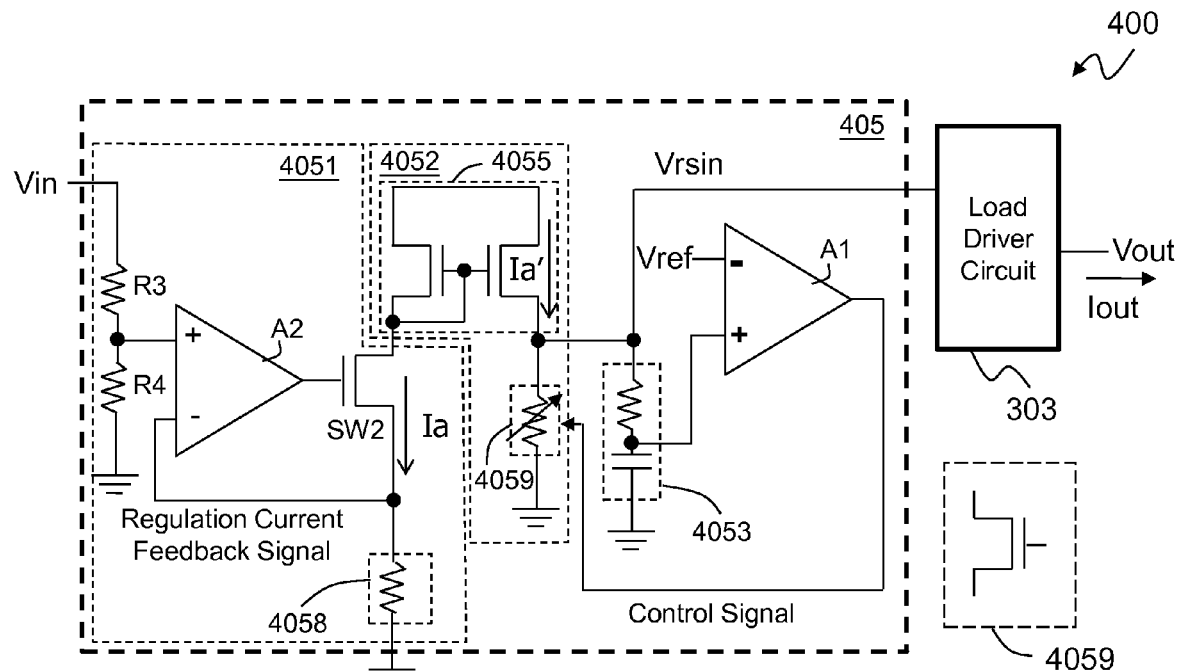
FIG. 5 shows a fifth embodiment of the present invention.

FIG. 5 shows a fifth embodiment of the present invention. This embodiment is different from the fourth embodiment in that, as shown in FIGS. 4 and 5, the variable resistor circuit 4054 and the impedance circuit 4056 in the fourth embodiment are replaced by a resistor 4058 and a variable resistor circuit 4059 in this embodiment, respectively. And in this embodiment, the control signal, which is generated by the differential amplifier circuit A1, controls a resistance of the variable resistor circuit 4059 to automatically adjust the conversion ratio from the regulation current to the regulation voltage Vrsin. The variable resistor circuit 4059 includes for example but not limited to a MOS device as shown in lower right of the figure, wherein its resistance is controllable by the control signal. In this embodiment, the regulation voltage Vrsin also has a substantially fixed average and/or fixed amplitude under different input voltages Vin. Under the same spirit of the present invention, the conversion ratio from the regulation current to the regulation voltage Vrsin can be adjusted in various other ways. For example, in the circuit of FIG. 5, the control signal may control a duplication ratio (from Ia to Ia') of the current mirror circuit 4055 (such as by changing a dimension of any transistor in the current mirror circuit 4055), and the regulation voltage Vrsin can be automatically adjusted thereby. For another example, the embodiments shown in FIGS. 4 and 5 may be combined, such that the control signal may control both the voltage-to-current converter circuit 4051 and the current-to-voltage converter circuit 4052.

Figure 6:
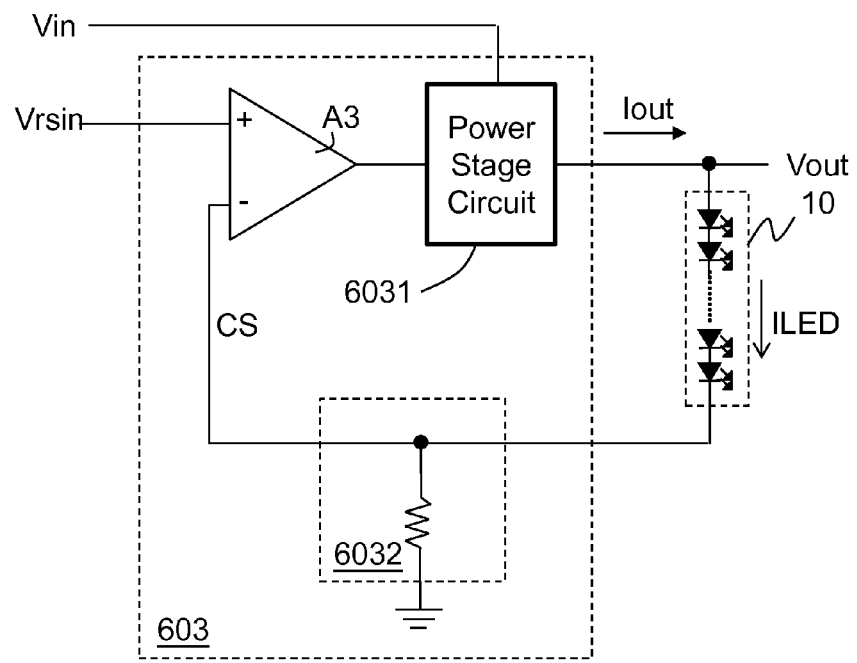
FIG. 6 shows a sixth embodiment of the present invention.

FIG. 6 shows a sixth embodiment of the present invention. This embodiment shows a more specific embodiment of the load driver circuit 603. As shown in the figure, the load driver circuit 603 has a differential amplifier circuit A3, a power stage circuit 6031, and a current sense circuit 6032. The differential amplifier circuit A3 generates the differential amplified signal according to the regulation voltage Vrsin and the current sense signal CS. The power stage circuit 6031 operates at least one power switch according to the differential amplified signal to convert the input voltage Vin or the regulation voltage Vrsin to the output voltage Vout, which is supplied to a load 10. The load 10 is for example but not limited to an LED circuit 10 as shown in the figure. Assuming that the output voltage Vout is not supplied to any other circuit, the output current Iout is equal to an LED current ILED. If the output voltage Vout is supplied to another load besides the LED circuit 10, then the LED current ILED is still related to the output current Iout with known relationship. The current sense circuit 6032 is provided in the loop of the LED current ILED (e.g., at the upper or lower end of the LED circuit 10), and generates the current sense signal according to the LED current ILED; the current sense signal is inputted to the differential amplifier circuit A3. By this arrangement, the LED current ILED is in phase with the regulation voltage Vrsin, according to the basic mechanism of feedback control. Because of the substantially fixed average value and/or fixed amplitude of the regulation voltage Vrsin, the LED current ILED also has a substantially fixed average value and/or fixed amplitude. Therefore, the LED circuit 10 can maintain the same brightness even if the input voltages Vin has a different specification.

Figure 7:
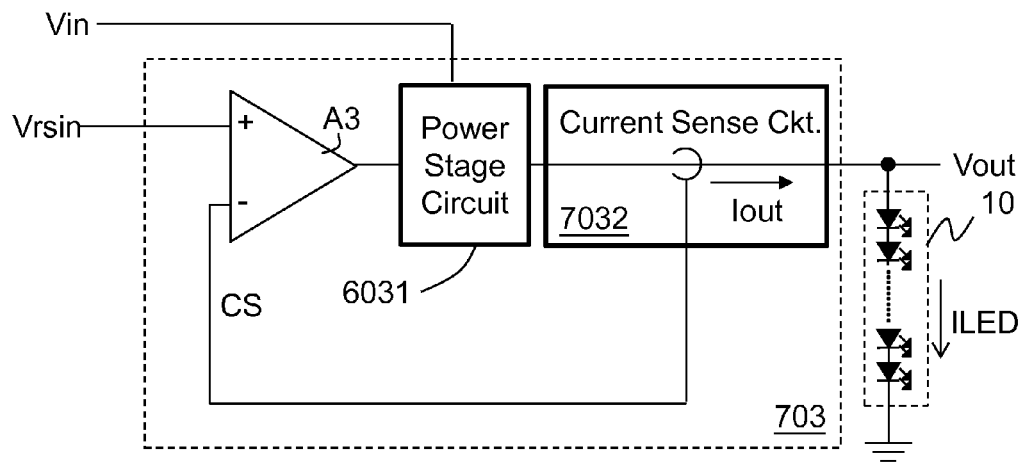
FIG. 7 shows a seventh embodiment of the present invention.

FIG. 7 shows a seventh embodiment of the present invention. This embodiment shows a more specific embodiment of the load driver circuit 703. As shown in the figure, the load driver circuit 703 includes the differential amplifier circuit A3, a power stage circuit 6031, and a current sense circuit 7032. This embodiment is different from the sixth embodiment in that, in this embodiment, the current sense circuit 7032 for example may sense the output current Iout instead of the LED current ILED.

Figure 8:
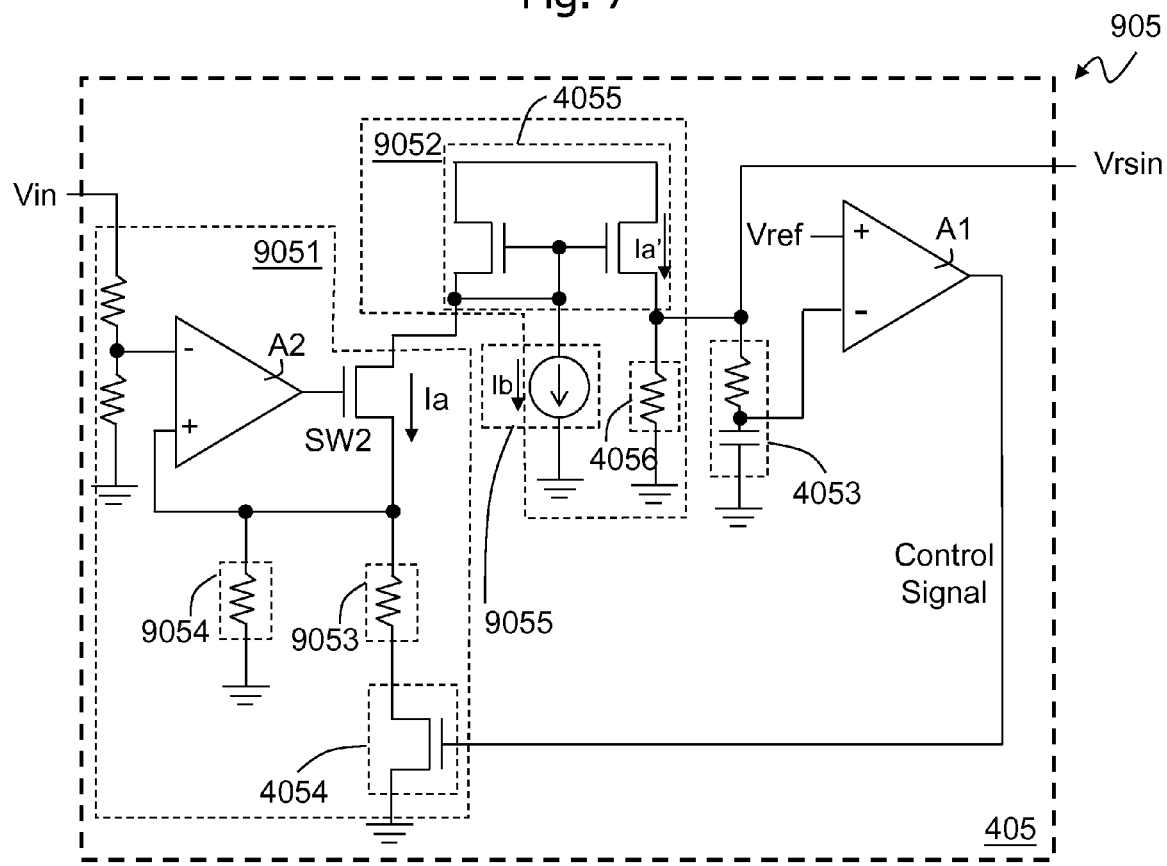
FIG. 8 shows an eighth embodiment of the present invention.
Figure 9A:
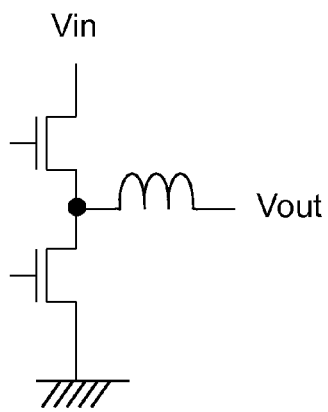
FIGS. 9A-9K show synchronous and asynchronous buck, boost, inverting, buck-boost, inverting-boost, and flyback power stage circuits.
Figure 9B:
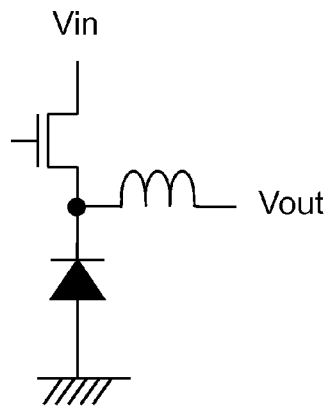
Figure 9C:
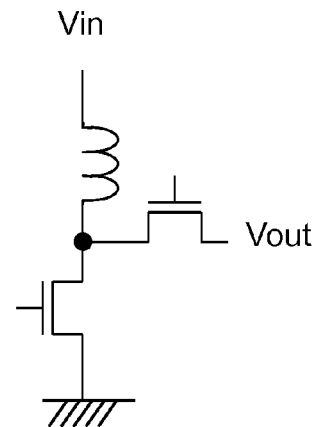
Figure 9D:
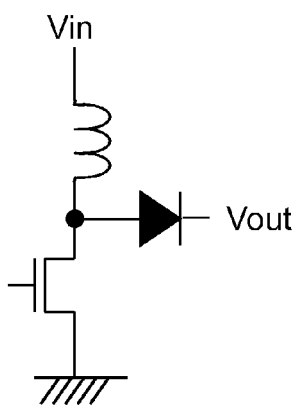
Figure 9E:
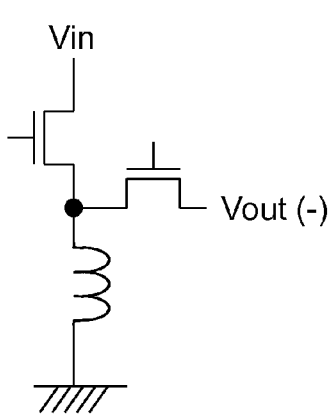
Figure 9F:
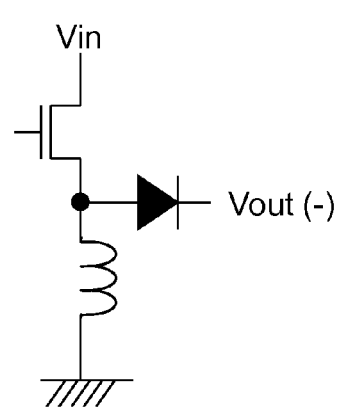
Figure 9G:
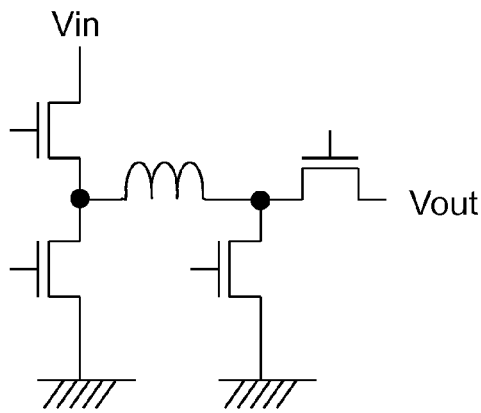
Figure 9H:
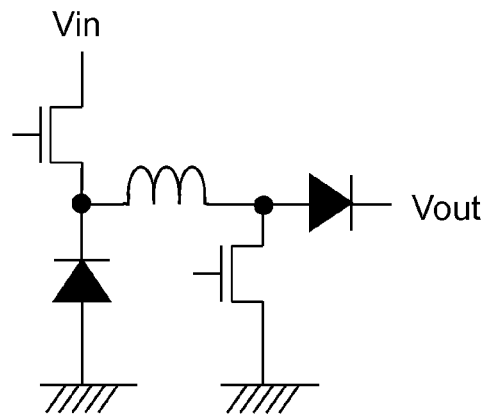
Figure 9I:
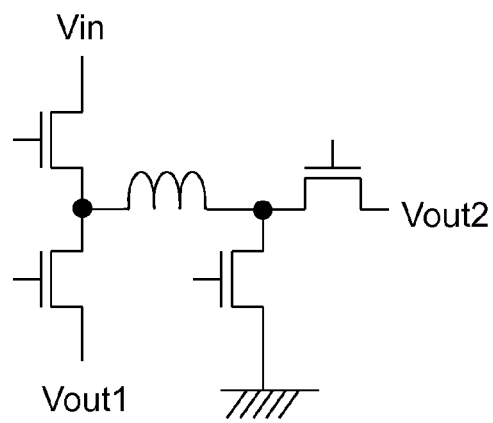
Figure 9J:
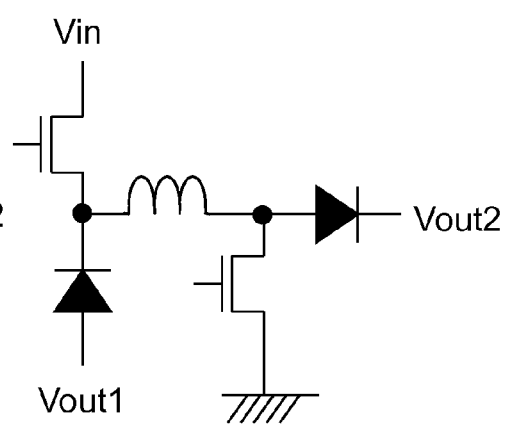
Figure 9K:
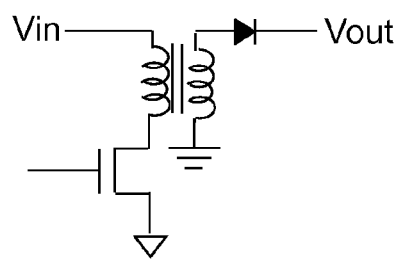

FIG. 8 shows an eighth embodiment of the present invention. As shown in FIG. 8, an automatic gain control circuit 405 includes a voltage-to-current converter circuit 9051, a current-to-voltage converter circuit 9052, the low-pass filter circuit 4053, and the differential amplifier circuit A1. This embodiment is different from the fourth embodiment (shown in FIG. 4) in that, in this embodiment, the voltage-to-current converter circuit 9051 further includes an upper limit gain determination circuit 9053 and a lower limit gain determination circuit 9054 besides the differential amplifier circuit A2, the transistor SW2, and the feedback circuit 4054. The upper limit gain determination circuit 9053 is connected with the variable resistor circuit 4054 in series, for determining an upper limit of the gain of the automatic gain control circuit 405. The upper limit gain determination circuit 9053 is for example but not limited to a resistor as shown in the figure. The lower gain limit determination circuit 9054 is connected with the variable resistor circuit 4054 in parallel, for determining a lower limit of the gain the automatic gain control circuit 905. More specifically, assuming that the variable resistor circuit 4054 is a MOS device as shown in the figure, when the MOS device is turned OFF, the resistance of the MOS device is infinite, and in this case the conversion ratio from the input voltage Vin to the regulation current is determined by the resistance of the lower gain limit determination circuit 9054. On the other hand, when the MOS device is completely turned ON, the resistance of the MOS device is zero, and in this case the conversion ratio from the input voltage Vin to the regulation current is determined by the resistance of the parallel circuit formed by the upper gain limit determination circuit 9053 and the lower gain limit determination circuit 9054.

In addition, referring to FIG. 8, this embodiment is further different from the fourth embodiment (as shown in FIG. 4) in that, in this embodiment, the current mirror circuit 9052 further includes a constant current source 9055, wherein the constant current source 9055 is for determining a minimum level (valley) of the regulation voltage Vrsin. More specifically, the regulation current Ia, the duplicated regulation current Ia', and a current Ib generated by the constant current source 9055 have a relationship of: Ia'=Ia+Ib. In other words, when the regulation current Ia is zero, the current Ib determines a minimum level of the duplicated regulation current Ia', and therefore the minimum level (valley) of the regulation voltage Vrsin is determined. When the valley of the regulation voltage Vrsin is determined, because its average value is substantially fixed, its amplitude will change correspondingly; that is, when its valley is increased, its peak is decreased, and when its valley is decreased, its peak is increased.

Certainly, the method of determining the upper gain limit and the lower gain limit may be applied to the fifth embodiment (as shown in FIG. 5) as well. For example, the upper gain limit determination circuit 9053 may be added in series connection to the variable resistor circuit 4059, and the lower gain limit determination circuit 9054 may be added in parallel connection to the variable resistor circuit 4059.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the differential amplifier circuit A1 may be changed to a comparator circuit, which generates the control signal in digital form to control the variable resistor with digital logic. Therefore in the context of the specification and the claims, it is intended for the term "comparison circuit" to be a genius term including the species of the differential amplifier circuit and the species of the comparator circuit. For another example, a device which does not substantially influence the primary function of a signal can be inserted between any two devices in the shown embodiments, such as a switch or the like, so the term "couple" should be a genius term including the species of direct connection and the species of indirect connection. For another example, the positive and negative input terminals of the comparison circuits are interchangeable, with corresponding amendment of the circuits processing these signals. In view of the foregoing, the spirit of the present invention should cover all such and other modifications and variations, which should be interpreted to fall within the scope of the following claims and their equivalents.

What is claimed is:

1. A power supply circuit, comprising:
  an automatic gain control circuit, including:
    a voltage-to-current converter circuit for converting an input voltage to a regulation current;
    a current-to-voltage converter circuit, which is coupled to the voltage-to-current converter circuit, for converting the regulation current to a regulation voltage;
    a low-pass filter circuit, which is coupled to the current-to-voltage converter circuit, for obtaining a low frequency signal from the regulation voltage; and
    a comparison circuit, which is coupled to the low-pass filter circuit, for generating a control signal according to the low frequency signal and a reference voltage; and
  a load driver circuit, which is coupled to the current-to-voltage converter circuit, for converting the input voltage or the regulation voltage to the output voltage and supplying an output current, wherein the output current is in phase with the regulation voltage;
  wherein the control signal is inputted to the voltage-to-current converter circuit or the current-to-voltage converter circuit, for adjusting a conversion ratio from the input voltage to the regulation current, or from the regulation current to the regulation voltage.

2. The power supply circuit of claim 1, wherein the voltage-to-current converter circuit includes:
  a differential amplifier circuit, for generating a differential amplified signal according to the input voltage and a regulation current feedback signal;
  a transistor, which is coupled to the differential amplifier circuit, for operating to generate the regulation current according to the differential amplified signal; and
  a variable resistor circuit, which is coupled to the transistor, for generating the regulation current feedback signal according to the regulation current, wherein a resistance of the variable resistor circuit is controlled by the control signal.

3. The power supply circuit of claim 2, wherein the variable resistor circuit includes a metal oxide semiconductor (MOS) device, which has a resistance controlled by the control signal.

4. The power supply circuit of claim 2, wherein the current-to-voltage circuit includes:
  a current mirror circuit, for generating a duplicated regulation current by duplicating the regulation current; and
  an impedance circuit, which is coupled to the current mirror circuit, for converting the duplicated regulation current to the regulation voltage.

5. The power supply circuit of claim 4, wherein the current mirror circuit further includes a constant current source, for determining a minimum level of the regulation voltage.

6. The power supply circuit of claim 2, wherein the voltage-to-current converter circuit further includes an upper limit gain determination circuit, which is connected to the variable resistor circuit in series, for determining an upper limit of a gain of the automatic gain control circuit.

7. The power supply circuit of claim 2, wherein the voltage-to-current converter circuit further includes a lower limit gain determination circuit, which is connected to the variable resistor circuit in parallel, for determining a lower limit of a gain of the automatic gain control circuit.

8. The power supply circuit of claim 1, wherein the current-to-voltage converter circuit includes:
   a current mirror circuit, for generating a duplicated regulation current by duplicating the regulation current; and
   a variable resistor circuit, which is coupled to the current mirror circuit, for converting the duplicated regulation current to the regulation voltage, wherein the variable resistor circuit has a resistance controlled by the control signal.

9. The power supply circuit of claim 8, wherein the variable resistor circuit includes a metal oxide semiconductor (MOS) device, which has a resistance controlled by the control signal.

10. The power supply circuit of claim 8, wherein the voltage-to-current converter circuit further includes an upper limit gain determination circuit, which is connected to the variable resistor circuit in series, for determining an upper limit of a gain of the automatic gain control circuit.

11. The power supply circuit of claim 8, wherein the voltage-to-current converter circuit further includes a lower limit gain determination circuit, which is connected to the variable resistor circuit in parallel, for determining a lower limit of a gain of the automatic gain control circuit.

12. The power supply circuit of claim 8, wherein the current mirror circuit further includes a constant current source, for determining a minimum level of the regulation voltage.

13. The power supply circuit of claim 1, wherein the load driver circuit includes:
   a differential amplifier circuit, for generating a differential amplified signal according to the regulation voltage and a current sense signal;
   a power stage circuit, for operating at least one power switch therein according to the differential amplified signal, to convert the input voltage to the output voltage and to supply an output current; and
   a current sense circuit, which is coupled to the differential amplifier circuit, for generating the current sense signal according to the output current or a signal which is related to the output current.

14. An automatic gain control circuit of a power supply circuit, wherein the power supply circuit is for converting an input voltage to an output voltage and supplying an output current, wherein the output current is in phase with the input voltage, the automatic gain control circuit comprising:
   a voltage-to-current converter circuit, for converting the input voltage to a regulation current;
   a current-to-voltage converter circuit, which is coupled to the voltage-to-current converter circuit, for converting the regulation current to a regulation voltage;
   a low-pass filter circuit, which is coupled to the current-to-voltage converter circuit, for obtaining a low frequency signal from the regulation voltage; and
   a comparison circuit, which is coupled to the low-pass filter circuit, for generating a control signal according to the low frequency signal and a reference voltage;
   wherein the control signal is inputted to the voltage-to-current converter circuit or the current-to-voltage converter circuit, for adjusting a conversion ratio from the input voltage to the regulation current, or from the regulation current to the regulation voltage.

15. The automatic gain control circuit of claim 14, wherein the voltage-to-current converter circuit includes:
   a differential amplifier circuit, for generating a differential amplified signal according to the input voltage and a regulation current feedback signal;
   a transistor, which is coupled to the differential amplifier circuit, for operating to generate the regulation current according to the differential amplified signal; and
   a variable resistor circuit, which is coupled to the transistor, for generating the regulation current feedback signal according to the regulation current, wherein a resistance of the variable resistor circuit is controlled by the control signal.

16. The automatic gain control circuit of claim 15, wherein the variable resistor circuit includes a metal oxide semiconductor (MOS) device, which has a resistance controlled by the control signal.

17. The automatic gain control circuit of claim 15, wherein the current-to-voltage circuit includes:
   a current mirror circuit, for generating a duplicated regulation current by duplicating the regulation current; and
   an impedance circuit, which is coupled to the current mirror circuit, for converting the duplicated regulation current to the regulation voltage.

18. The automatic gain control circuit of claim 17, wherein the current mirror circuit further includes a constant current source, for determining a minimum level of the regulation voltage.

19. The automatic gain control circuit of claim 15, wherein the voltage-to-current converter circuit further includes an upper limit gain determination circuit, which is connected to the variable resistor circuit in series, for determining an upper limit of a gain of the automatic gain control circuit.

20. The automatic gain control circuit of claim 15, wherein the voltage-to-current converter circuit further includes a lower limit gain determination circuit, which is connected to the variable resistor circuit in parallel, for determining a lower limit of a gain of the automatic gain control circuit.

21. The automatic gain control circuit of claim 14, wherein the current-to-voltage converter circuit includes:
   a current mirror circuit, for generating a duplicated regulation current by duplicating the regulation current; and
   a variable resistor circuit, which is coupled to the current mirror circuit, for converting the duplicated regulation current to the regulation voltage, wherein the variable resistor circuit has a resistance controlled by the control signal.

22. The automatic gain control circuit of claim 21, wherein the variable resistor circuit includes a metal oxide semiconductor (MOS) device, which has a resistance controlled by the control signal.

23. The automatic gain control circuit of claim 21, wherein the voltage-to-current converter circuit further includes an upper limit gain determination circuit, which is connected to the variable resistor circuit in series, for determining an upper limit of a gain of the automatic gain control circuit.

24. The automatic gain control circuit of claim 21, wherein the voltage-to-current converter circuit further includes a lower limit gain determination circuit, which is connected to the variable resistor circuit in parallel, for determining a lower limit of a gain of the automatic gain control circuit.

25. The automatic gain control circuit of claim 21, wherein the current mirror circuit further includes a constant current source, for determining a minimum level of the regulation voltage.

* * * * *